Dec. 1, 1970  B. C. KEMPSON  3,543,515
HYDRAULIC APPARATUS
Filed Oct. 14, 1968  2 Sheets-Sheet 2

Bertram C. Kempson
INVENTOR
BY Christensen,
Sanborn & Matthews
ATTORNEY

United States Patent Office 3,543,515
Patented Dec. 1, 1970

3,543,515
HYDRAULIC APPARATUS
Bertram Carl Kempson, Cheltenham, England, assignor to Dowty Hydraulic Units Ltd., Cheltenham, England, a British company
Filed Oct. 14, 1968, Ser. No. 767,430
Claims priority, application Great Britain, Oct. 20, 1967, 47,913/67
Int. Cl. F15b 15/18
U.S. Cl. 60—52                                    13 Claims

ABSTRACT OF THE DISCLOSURE

This invention relates to a hydraulic power transmission comprising a variable positive displacement pump in hydraulic connection with a variable positive displacement motor, the speed ratio between the pump speed and the motor speed being dependent on the relative displacements of the pump and the motor. The invention provides a first spring-loaded variable-volume device arranged to vary pump displacement, a second spring-loaded variable-volume device arranged to adjust motor displacement and a control adapted to supply fluid at variable pressure to both the first and second spring-loaded variable-volume devices. The spring loading of the variable-volume devices is so arranged that within a first range of variation of fluid pressure the pump will increase its displacement from zero to a maximum and in a second range of variation of fluid pressure the motor will reduce displacement from the maximum to a minimum value.

FIELD OF THE INVENTION

This invention relates to hydraulic apparatus and more particularly it relates to a hydraulic power transmission.

SUMMARY OF THE INVENTION

In accordance with the present invention, a hydraulic power transmission comprises a variable positive displacement pump in hydraulic connection with a variable positive displacement motor, a first spring-loaded variable volume device connected to respond to fluid at variable pressure to vary pump displacement in accordance with the pressure, a second spring-loaded variable volume device connected to respond to the fluid at variable pressure to vary motor displacement in accordance with the pressure, and a manually or automatically adjustable control to supply fluid at variable pressure, the variable volume devices being arranged such that variation of pressure of the fluid within a first range adjusts only the pump displacement and variation of pressure of the fluid within a second range adjusts only motor displacement.

At least one of the variable-volume devices may include fluid-pressure-loading means to assist the spring loading.

The arrangement may be such as to include a third range of pressure of the fluid in between the first and second ranges, within which variation of the fluid pressure adjusts pump and motor displacements simultaneously. Alternatively there may be a third range of pressure of the fluid in between the first and second ranges in which variation of the pressure will adjust neither the pump nor the motor displacements.

The arrangement of a spring-loaded variable volume device to respond to a particular range of pressures depends on the product of the working area of the device, the spring-loading applied and also the loading of any fluid pressure assisting the spring-loading together with stops for movement of the device to limit such movement to a desired range of displacement variations, the rate of the spring-loading and the pressure range of fluid being so relatively arranged that the device will occupy any position between the stops when an appropriate pressure within the range is applied.

BRIEF DESCRIPTION OF THE DRAWINGS

Of the two accompanying drawings.

DESCRIPTION OF THE PREFERRED EMBODIMENTS

Figure 1:
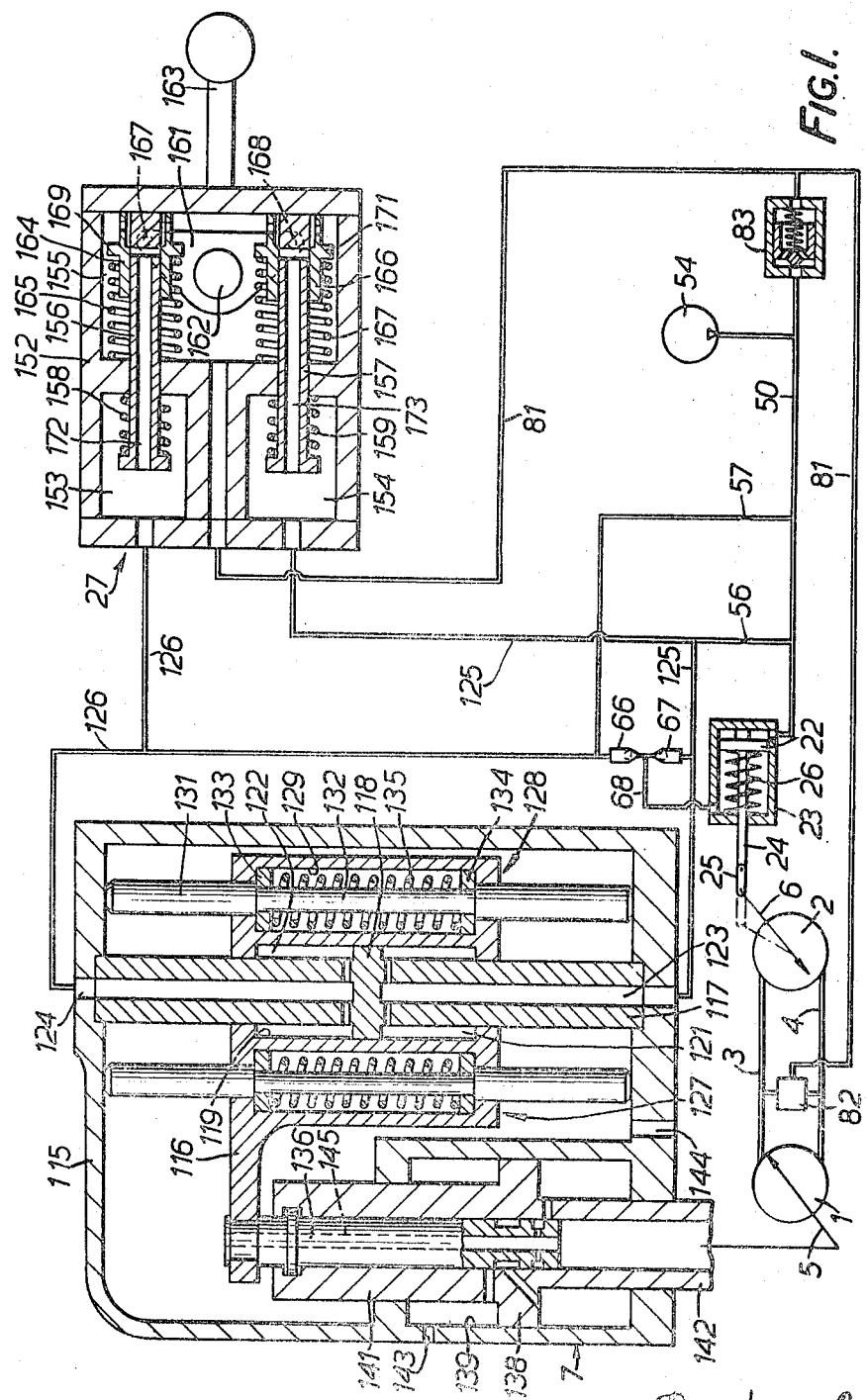
FIG. 1 shows a first hydraulic power transmission.

With reference to FIG. 1, the first hydraulic power transmission is composed by a reversible variable positive pump 1, a variable positive displacement motor 2 and a pair of pipe lines 3 and 4 which carry hydraulic liquid in flow and return relation between the pump and the motor. To adjust displacement of the pump a lever 5 is provided which is indicated in the centre of its range of movement which corresponds to zero displacement. Upward movement of the lever 5 corresponds to forward displacement of the pump and downward movement of lever 5 from the position shown in the drawing corresponds to reverse displacement. The actual value of the displacement will be proportional to the movement of the lever 5 from the position shown in the drawing.

Similarly, the motor 2 includes a lever 6 for adjustment of its displacement. The motor 6, whilst of variable displacement, is adjustable only over a limited range from the maximum position shown in FIG. 1 to another position shown in dotted lines which represents the minimum displacement for the motor.

For operation of the pump lever 5 an actuator 115 is provided from which a plunger 142 extends to the lever 5. Within the actuator 115 a movable member 116 is slidably mounted on a piston rod 117 fixedly mounted within the actuator casing. The piston rod 117 includes a piston 118 fixedly mounted thereon. A cylinder 119 formed within the movable member 116 engages the piston 118 to define a pair of working spaces 121 and 122, one at either end of the cylinder 119. Hydraulic passages 123 and 124 extend respectively through the piston rod 117 to the working spaces 121 and 122. These passages extend through the wall of the actuator and terminate in pipe connections 125 and 126. The movable member 116 also includes a pair of caged spring units 127 and 128 symmetrically disposed about the cylinder 119. For convenience only one of these units will be described. The caged spring unit 128 comprises a chamber 129 within the member 116, a rod 131 extending through the chamber 129 to engage opposite sides of the wall of the interior of the casing of the actuator, a reduced portion 132 of the rod within the chamber 129, a pair of annular abutment members 133 and 134 slidably mounted on the reduced portion 132 and a compression spring 135 acting between the abutment members 133 and 134. The action of the spring urges the abutment members outwardly to engage the ends of the larger portions of the rod 131 and also to engage the ends of the chamber 129. If the movable member 116 moves axially it will engage one or the other of the abutment members 133 or 134 to move it along the reduced portion 132 of the rod towards the other abutment member so compressing the spring and at the same time applying the spring restoring force tending to restore member 116 towards the central position in which the abutments 131 and 134 both engage their respective ends of the chamber 129. The piston 118, the cylinder 119 and the springs 135 form the first spring-loaded variable volume device.

Within the actuator unit 115 the movable member 116 engages the control valve member 136 of a servo motor 7. Servo motor 7 is of conventional construction comprising a piston 138 slidable in a cylinder 139. Plungers 141 and 142 extend from opposite sides of the piston 138 through the ends of the cylinder 139 in a fluid-tight manner. Plunger 141 is considerably larger in cross-section than plunger 142. The control valve 136 extends within the plunger 141. Liquid at low pressure is supplied at the connection 143 into the end of cylinder 139 containing plunger 141. The valve 136 connects the lower end of the cylinder 139 containing the plunger 142, either to the pressure of connection 143, or to the drain pressure of a reservoir which is connected at 144 to the casing of the actuator unit 115, and in communication with the lower end of the cylinder through a passage 145 within the valve 136. Further description of the servo motor is thought unnecessary except to say that the piston 138 will follow movement of the movable member 116 with substantial force.

The variable volume device acting on the motor lever 6 comprises a piston 22 slidably mounted in a fixed cylinder 23 and a piston rod 24 extending from the piston 22 through a link 25 to the lever 6. A pre-loaded compression spring 26 within cylinder 23 engages piston 22 to urge it to one end of the cylinder so as to carry lever 6 to a maximum displacement position.

Hydraulic liquid at pressure is fed to the cylinders 119 and 23 through the medium of a control 27 which may be remotely located and which is adjusted by means of a manually operable lever 163. The control 27 has a casing 152 divided by partitions into three chambers 153, 154 and 155. A plunger 156 is slidable in a liquid-tight manner in the wall between chambers 153 and 155. A further plunger 157 similar to plunger 156 is slidable in the wall between the chambers 154 and 155. Chamber 153 is connected to the pipe 126, chamber 154 is connected to the pipe 125 and chamber 155 is connected to the pipe 81. Within chamber 153 a compression spring 158 acts between the wall of the chamber and the plunger 156 to urge the plunger into chamber 153 against the pressure difference existing in the two chambers 153 and 155. Similarly a spring 159 acts on plunger 157 to urge it into chamber 154 against the pressure difference existing in the two chambers 154 and 155. Within chamber 155 lever 161 extends transversely to the plungers 156 and 157 and is carried by a pivotal shaft 162 which extends in a liquid-tight manner through the chamber 155 to an external manual control lever 163. Within chamber 155 a sleeve 164 is slidable on plunger 156, a spring 165 urging the sleeve in the direction away from the chamber 153. Similarly, a sleeve 166 within chamber 155 is mounted on plunger 157 and is urged by spring 167 in the direction away from chamber 154. The two ends of the lever 161 each includes a pin respectively 167 and 168 which engage flanges 169 and 171 on the sleeves 164 and 166 for movement of the sleeves against the loading of the springs 165 and 167. Plunger 156 includes an axial passage 172 which opens at one end in the chamber 153 and at the other end in the chamber 155. Similarly, plunger 157 includes an axial passage 173 opening at one end into chamber 154 and at the other end into chamber 155. The sleeve 164 is arranged to open or close the passage 172 within chamber 155 according to its axial movement, and similarly the sleeve 166 is arranged to close the opening of passage 173 in chamber 155 according to its axial movement. In the position shown for the lever 161 neither sleeve is depressed but rather each sleeve engages an end wall of chamber 155 under the action of its associated spring. In this position the respective plungers 156 and 157 are also arranged to engage the same end wall to resist the endwise forces applied by the pressures in the chambers. It is arranged that in these positions the passages 172 and 173 within the chamber 155 are closed by the sleeves.

For the supply of control liquid at low pressure a small fixed displacement pump such as a gear pump 54 is driven with the transmission pump 1. The pump 54 draws liquid from the reservoir and delivers it at low pressure to a pipe 50. The pipe 125 is connected to the pipe 50 through the medium of restrictor 56, and pipe 126 is connected to pipe 50 through the medium of the restrictor 57. The pipe 50 is also connected to the end of cylinder 23 remote from the connecting rod 24. A pair of non-return valves 66 and 67 are connected between pipes 125 and 126 and are arranged to connect to a pipe 68 the lower of the two pressures in the pipes 125 and 126. The pipe 68 is connected to the end of cylinders 23 adjacent the connecting rod 24. The pipe 81 connects chamber 155 of control 27 to a valve unit 82 which in turn is connected to supply the low pressure from pipe 81 into the transmission pipe 3 or 4 which is at the lower pressure. A reducing valve 83 connects the delivery pipe 50 of make up pump 54 into the pipe 81 to determine a fixed pressure drop between the pipes 50 and 81.

For operation, in order to select the zero displacement condition for the transmission pump 1, lever 163 is located in a central position as shown in the drawing. The two passages 172 and 173 into the chamber 155 are then closed by the sleeves. Constant flow of liquid through the restrictors 56 and 57 is thereby prevented and the pressures in working spaces 121 and 122 will be equal. Caged spring 135 will then locate the movable member 116 in a central position which in turn will cause servo piston 138 to be held in a central position in which the displacement of the transmission pump is zero. Assuming now that it is desired to increase the speed ratio of the transmission in the reverse sense, the lever 163 is moved angularly to move the sleeve 164 along plunger 156. The sleeve 166 will not move and the passage 173 will be retained closed. The movement of the sleeve 164 will allow liquid to flow through restrictor 57, pipe 126 and passage 172 into the chamber 155. From this chamber liquid will flow through passage 81 to the transmission. This flow of liquid will cause a pressure drop at restrictor 57 and this pressure drop will be fed to the working space 122. The reduced pressure will also act in chamber 153 on plunger 156 allowing the spring 158 to move plunger 156 to the extent that passage 172 is almost completely closed by the sleeve 164 whereby the pressure difference between chambers 153 and 155 produces a force on plunger 156 which is exactly balanced by spring 158. Thus it will be seen that the position to which the sleeve 164 is moved will determine the permissible extension of spring 158 and will thus determine the pressure reduction obtained in chamber 153 and in the working space 122. In accordance with the reduced pressure in chamber 122, the caged spring 135 will urge movable member 116 downwardly to cause downward movement of servo piston 138 and to give reverse displacement to the transmission pump 1. The greater the movement of the lever 163, the greater will be the pressure lost in the working space 122 and the greater the increase in pump displacement in the reverse direction. The reduced pressure in pipe 126 is also fed through non-return valve 66 to cylinder 23 and the result will be an increased force on the piston 22.

However the loading of spring 26 is such that over a first part of the range of movement of lever 163 from the central position the loss of pressure in pipe 126 will not cause movement of piston 122. This range of pressure corresponding to the first part of movement of the lever 163 is pressure within the first range which is arranged to cause displacement adjustment of pump 1 only. At a predetermined position in the movement of the lever 163 the pressure loss from chamber 153 would be such as to have caused full displacement adjustment of the transmission pump 1 in the reverse direction and further loss of pressure in the working space 122 will not be able to cause further movement of the movable member 116 against the springs 135. Further movement of the lever 163 into the second part of its range will then cause a still further reduction of pressure in chamber 153. The spring 26 is arranged to respond to this further reduction of pressure i.e. the second range of pressure and in accordance with the value of pressure the piston 22 will move against the spring 26 to reduce displacement of the transmission motor 2.

In order to obtain a forward speed ratio through the transmission the lever 163 may be moved in the opposite direction from its neutral position so as to cause movement of the sleeve 166 along its plunger 157. The pressure in chamber 153 will then remain at its maximum value and pressure in chamber 154 will be controllably reduced in accordance with the movement of lever 163. Such reduction in pressure is fed to the working space 121 and the resulting movement of movable member 116 will cause movement of servo piston 138 to adjust transmission pump 1 to forward displacement. As described for reverse speed ratio the first range of movement of lever 163 from the neutral position will produce reduction of pressure in chamber 154 in the first range which will cause movement of movable member 116 and corresponding adjustment of the displacement of transmission pump 1 in the forward sense. At a predetermined position in the movement of the lever 163 the first range will reach its maximum reduction and the pump will attain a maximum reverse displacement. Further movement of the lever 163 to reduce the pressure still further will then cause movement of the servo piston 22 to reduce the displacement of the motor, the low pressure now being supplied by virtue of the non-return valve 67 from the chamber 154.

In this embodiment it will be appreciated that the first and second pressure ranges are reduced pressure ranges. It is equally within the scope of the present invention to arrange that the first and second ranges are increasing pressures and reference is now made to FIG. 2 of the accompanying drawings for description of another embodiment of the invention in which the first and second ranges are increasing pressures.

Figure 2:
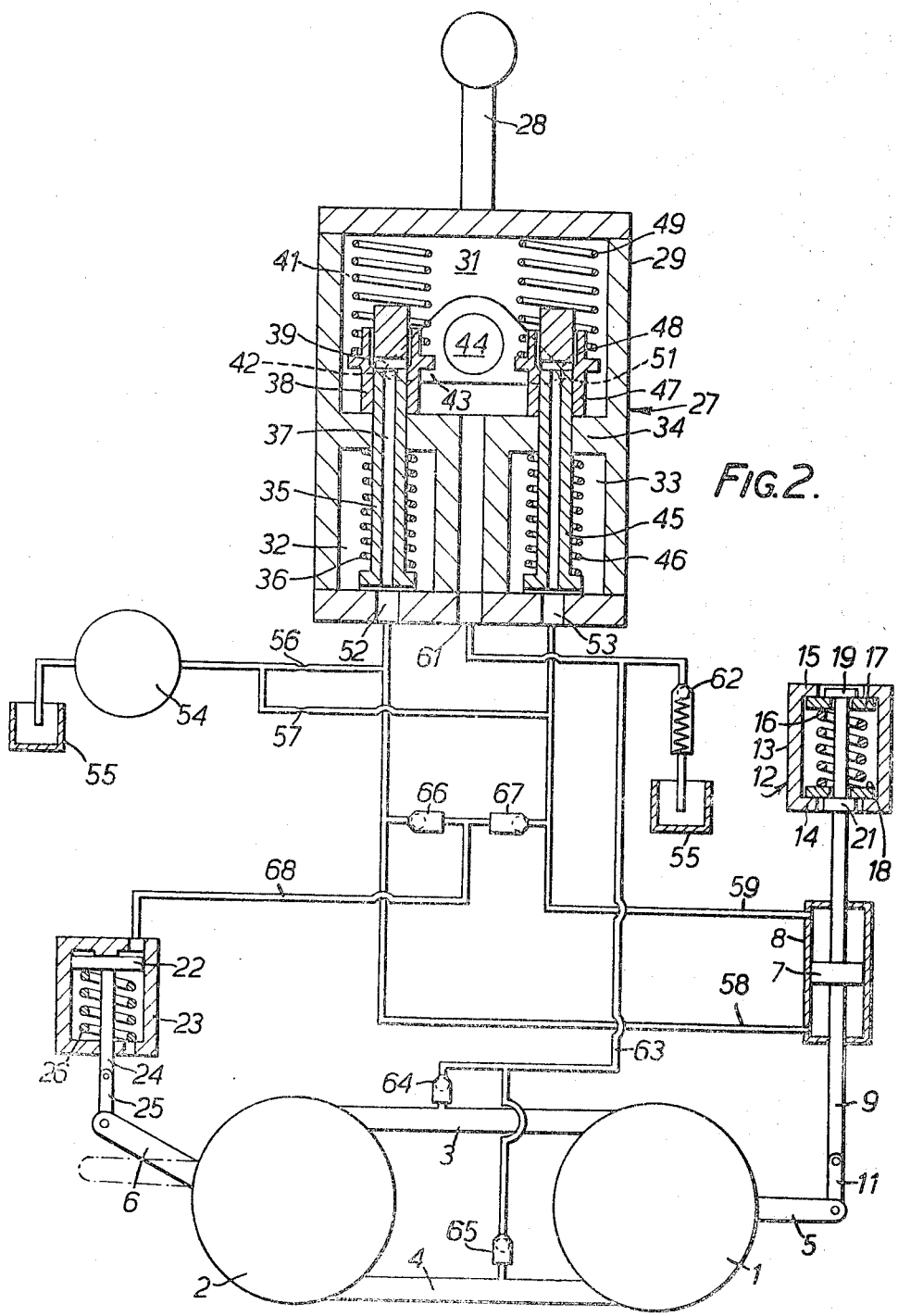
FIG. 2 shows a second hydraulic power transmission.

With reference to FIG. 2, in the second embodiment the transmission pump and motor 1 and 2 and the pipes 3 and 4 are arranged as in FIG. 1 and include displacement adjusting levers 5 and 6.

For operation of the pump lever 5 the variable volume device is provided comprising a piston 7 movable within a cylinder 8 the cylinder being fixed in position. A piston rod 9 extends from either side of the piston 7 in a sealed manner through the ends of the cylinder 8. The part of the rod 9 extending downwardly is connected by the link 11 to the lever 5. The part of the rod 9 extending upwardly enters a caged spring unit 12. This unit compirses a cylinder member 13 having inwardly directed flanges 14 and 15 at either end. Within the cylinder a compression spring 16 is located which acts between a pair of washers 17 and 18 one at either end thereof to urge the washer 17 against the flange 15 and washer 18 against flange 14. Two fixed stop members 19 and 21 are secured to the piston rod 9, the space in between the stop members being the same as the space in between the flanges 14 and 15. The compression of the spring 16 in urging washers 17 and 18 against the flanges 14 and 15 will also engage the washers against stops 19 and 21 so holding the stops relative to the flanges 14 and 15. Movement of the rod 9 in an upward sense will cause the stop 21 to engage washer 18 to compress spring 16. Movement of the rod 9 downwardly will cause stop 19 to engage washer 17 also to compress spring 16. The pre-load applied to the spring 16 will ensure that more than a predetermined force must be applied by the piston 7 before the rod 9 and lever 5 can move. The variable volume device acting on motor lever 6 comprises a piston 22 slidably mounted in a fixed cylinder 23 and a piston rod 24 extending from piston 22 through a link 25 to the lever 6. A pre-load compression spring 26 within cylinder 23 engages piston 22 to urge it upwardly to the end of the cylinder so as to carry lever 6 to the maximum displacement position.

Hydraulic liquid at positive pressure is fed to the cylinders 8 and 23 through the medium of a control 27 which is adjusted by means of a manually-operable lever 28. The control 27 includes a casing 29 divided into three chambers 31, 32 and 33. A wall 34 separates chamber 31 from chambers 32 and 33. A plunger 35 extends through a bore in wall 34 between chambers 31 and 32, a spring 36 acting between wall 34 and plunger 35 to urge the latter downwardly. An internal bore 37 extends through plunger 35 to communicate freely with chamber 32 and to communicate in a restricted manner with the chamber 31. The restricting effect is achieved by virtue of a sleeve 38 slidable on plunger 35 in chamber 31 to open or close port 39 which forms the connection from bore 37 to chamber 31. The sleeve 38 is adjustable in position axially of the plunger 35 by means of a compression spring 41 acting downwardly on the sleeve and peg 42 of lever 43 acting upwardly on the sleeve. Lever 43 is carried on a shaft 44 pivotally mounted and sealed in the casing 29 to enter chamber 31. The shaft 44 is externally connected to a manual control lever 28.

In a similar way plunger 45 slidably mounted in the wall 34 between the chambers 31 and 33 will have been urged into chamber 33 by a compression spring 46. A sleeve 47 carried by plunger 45 into chamber 31 closes port 48 connected to a bore extending through the plunger into chamber 33. Sleeve 47 is urged downwardly by compression spring 49 and upwardly by peg 51 forming part of lever 43.

Chambers 32 and 33 respectively include connections 52 and 53. A low pressure pump 54 of small capacity driven in conjunction with the transmission pump 1 draws liquid from reservoir 55 and delivers it through a pair of restrictors 56 and 57 to the two connections 52 and 53. Pipes 58 and 59 extend from two connections 52 and 53 through two ends of cylinder 8. The chamber 31 has a connection 61 from which low pressure liquid leaves the control 27. The pressure of this low pressure liquid is determined by the spring-loaded relief valve 62 arranged to vent excess liquid to reservoir 55. From the connection 61 a pipe 63 extends to a pair of non-return valves 64 and 65 controlling the entry of low pressure liquid into one or the other of two transmission pipes 3 or 4 at the lower pressure.

A pair of non-return valves 66 and 67 connect respectively from the pipes 58 and 59 to a pipe 68 which extends to the cylinder 23. The arrangement of the non-return valves 66 and 67 is to select the higher pressure of the pipes 58 and 59 to feed to pipe 68.

In the control unit 27 there are two separate controls, comprised firstly by the plunger 35 and its associated sleeve and springs and secondly by the plunger 45 and its associated sleeve and springs. The control handle 28 and the lever 43 are so arranged that the sleeves 38 and 47 are moved alternatively, there being a central zero position as shown in the drawing in which neither of the sleeves 38 and 47 are moved from their rest positions. In the rest position of each sleeve the spring 35 or 46 of the associated plunger is fully extended and exerts its lowest loading. If sleeve 38 is moved upwardly, low pressure liquid flows through restrictor 56 into the chamber 32 and acts on the plunger 35 in an upward direction to tend to compress spring 36. Liquid leaves chamber 32 through the centre of bore 37 and the restricted port 39. Actual movement of the plunger 35 will adjust the opening permitted of the port 39 by sleeve 43 and the plunger will come to rest at a position closely determined by the position of the sleeve 38, the pressure in chamber 32 then being the pressure determined by the loading of the spring 36 when the plunger 35 has moved so that restricted flow passes from the port 39. Movement of the sleeve 38 by peg 42 and spring 41 allows a considerable range of adjustment for the pressure in chamber 32, the minimum pressure being for the position shown in the drawing and the maximum pressure being that when sleeve 38 is raised against spring 41 to a maximum extent. Increase in pressure in the chamber 32 by adjustment of sleeve 38 is accomplished by moving handle 28 from the illustrated central position towards the right hand. This will cause increase in pressure to be communicated to pipe 58 and the lower end of cylinder 8 causing piston 7 to rise against compression spring 16 thus deflecting displacement control lever 5 in the forward direction.

If handle 28 is moved to the left, the peg 51 will lift sleeve 47, the sleeve 38 then being in its lowermost position. The lifting of sleeve 47 will raise pressure in chamber 33, such pressure being communicated to pipe 59. In this case the pressure in pipe 59 is higher than in pipe 58 and piston 7 will be deflected downwardly against the loading of the spring 16.

The spring 16 is so arranged that over approximately one half of the movement of lever 28 either to the left or to the right from its central position the pressure rise given to the upper or the lower end of cylinder 8 is sufficient to cause full deflection of piston 7 against the loading of spring 16 giving either full forward or full reverse displacement to the transmission pump 1. When the lever 28 is moved beyond the approximate half-way position either to the right or to the left as seen in the drawing, the pressure rise given to the chamber 32 or 33 then reaches a sufficient value to cause deflection of the piston 22 in cylinder 23 against the loading of spring 26. It will be appreciated that the higher of the two pressures in the chambers 32 and 33 is selected by the non-return valves 66 and 67 and fed to cylinder 23. Thus the second half of the movement of lever 28 either to the full right hand or the full left hand positions will cause downward movement of piston 22 which will reduce selected displacement of the motor 2 by movement of the piston 22.

Thus is will be seen that in selecting forward rotation for the motor 2 the handle 28 is moved to the right, the first half of such movement giving full deflection of piston 7 to increase pump displacement from zero to maximum and the second half of such movement reducing displacement of the motor from the maximum to the predetermined minimum value. Similarly, for movement of handle 28 to the left for reverse displacement, graduated control of first the pump displacement and then the motor displacement is obtained to give reversed motor rotation. In this arrangement graduated control of pump and motor displacements results from the effect that the springs 16 and 26 have substantial rate and require increasing pressure to effect increasing deflection. The spring 16 acting on the pump controlling piston 7 will always respond to the pressure difference between the two ends of cylinder 8. However one or other end of the cylinder 8 will always be at a minimum pressure selected by one or other of the two controls since pressure delivered by one control only can be increased at any one time. The pressure loading applied to the spring 26 is considerably larger than the pressure loading on spring 16 since the spring 26 must not deflect until the pressure exceeds a value which comprises the sum of the pressure loading of the by-pass valve 62 and the minimum pressure developed at either control. The loadings of the springs 16 and 26 are preferably such that there is a very slight increase in pressure from the position of lever 28 in which full displacement is given to pump 5 and the further position of lever 28 in which the displacement of the motor begins to reduce. It will be seen that half of the movement of the lever 28 from the zero position towards either the right or the left will cause control pressure adjustment over the first range within which pump displacement is adjustable from zero to maximum displacement. Movement of the lever 28 in the second half of the movement either to the right or left from the central position represents adjustment of control pressure within the second range whereby the motor displacement is continuously variable from maximum to minimum displacement with increase in control pressure.

I claim:
1. A hydraulic power transmission comprising a variable positive displacement pump in hydraulic connection with a variable positive displacement motor, a first spring-loaded variable-volume device connected to respond to fluid at variable pressure to vary pump displacement in accordance with the pressure, a second spring-loaded variable-volume device connected to respond to the fluid at variable pressure to vary motor displacement in accordance with the pressure, and adjustable control means to supply fluid at a pressure variable in accordance with variation in the setting of the control means, the variable-volume devices being arranged such that variation of pressure of the fluid within a first range adjusts only the pump displacement and variation of pressure of the fluid within a second range adjusts only motor displacement, the ranges of pressure variation corresponding to different ranges of setting of the control means.

2. A hydraulic power transmission as claimed in claim 1, wherein at least one of the variable-volume devices includes fluid-pressure-loading means to assist the spring loading.

3. A hydraulic power transmission as claimed in claim 1, wherein the arrangement is such as to include a third range of pressure of the fluid in between the first and second ranges within which variation of the fluid pressure by variation in setting of the control means adjusts pump and motor displacements simultaneously.

4. A hydraulic power transmission as claimed in claim 1, wherein the arrangement is such as to include a third range of pressure of the fluid in between the first and second ranges in which variation of the pressure will by variation in setting of the control means adjust neither the pump nor the motor displacements.

5. A hydraulic power transmission as claimed in claim 1, wherein the pump is of reversible variable-displacement and including a forward control means and a reverse control means for delivering forward and reverse fluid at pressures variable in accordance with the settings of the control means, a first spring-loaded variable-volume device having a forward and a reverse variable-volumes connected separately to the forward and reverse fluid pressures, an operating device to adjust the forward and reverse control means alternatively, and selecting valve means to connect the second spring-loaded variable-volume device to the control means selected for variation by the operating device.

6. A hydraulic power transmission as claimed in claim 5, wherein the spring loading for the first spring-loaded variable-volume device comprises a spring, and a pair of stops for retaining the spring in a compressed state, and the forward and reverse variable-volumes are oppositely connected to act on the spring and on the pump displacement regulator, the arrangement being such that the spring, when it engages both stops, holds the pump displacement regulator at zero displacement and such that a predetermined pressure variation must occur in one or other variable-volume to move the displacement regulator from the zero displacement position.

7. A hydraulic power transmission as claimed in claim 1, wherein the adjustable control means comprises a fixed restrictor, a variable restrictor, a fluid-pressure source and a low pressure zone between which the restrictors are connected in series, the variable restrictor including a spring-loaded piston movable in response to pressure at the junction of the restrictors to adjust a restricting passage so that the junction pressure is in accordance with the spring-loading on the piston, and passage means to carry variable pressure fluid from the junction of the restrictors to the spring-loaded variable-volume devices.

8. A hydraulic power transmission as claimed in claim 7, wherein the restricting passage includes an adjustably-located sleeve for the piston such that piston movement relative thereto adjusts the restricting effect of the restricting passage, thereby adjusting the junction pressure acting on the piston to a value which depends on the position of the sleeve.

9. A hydraulic power transmission as claimed in claim 8, including a forward adjustable control means and a reverse adjustable control means each as in claim 8 and a manually operable lever means alternatively engageable with one or other sleeve of the forward or reverse control means in movement in the forward or reverse direction from a neutral position.

10. A hydraulic power transmission as claimed in claim 1, wherein the variable fluid pressure is at a high value for zero pump displacement and progressively reduces in value through the first and the second ranges.

11. A hydraulic power transmission as claimed in claim 1, wherein the variable fluid pressure is at a low value for zero pump displacement and progressively increases in value through the first and second ranges.

12. A hydraulic power transmission comprising a variable positive displacement pump in hydraulic connection with a variable positive displacement motor, a first spring-loaded variable-volume device connected to respond to fluid at variable pressure to vary pump displacement in accordance with the pressure, a second spring-loaded variable-volume device connected to respond to the fluid at variable pressure to vary motor displacement in accordance with the pressure, and a manually or automatically adjustable control to supply fluid at variable pressure, the variable-volume devices being arranged such that variation of pressure of the fluid within a first range adjusts only the pump displacement and variation of pressure of the fluid within a second range adjusts only motor displacement, the arrangement being such as to include a third range of pressure of the fluid in between the first and second ranges within which variation of the fluid pressure adjusts pump and motor displacements simultaneously.

13. A hydraulic power transmission comprising a variable positive displacement pump in hydraulic connection with a variable positive displacement motor, a first spring-loaded variable-volume device connected to respond to fluid at variable pressure to vary pump displacement in accordance with the pressure, a second spring-loaded variable-volume device connected to respond to the fluid at variable pressure to vary motor displacement in accordance with the pressure, and a manually or automatically adjustable control to supply fluid at variable pressure, the variable-volume devices being arranged such that variation of pressure of the fluid within a first range adjusts only the pump displacement and variation of pressure of the fluid within a second range adjusts only motor displacement, the arrangement being such as to include a third range of pressure of the fluid in between the first and second ranges in which variation of the pressure will adjust neither the pump nor the motor displacements.

References Cited

UNITED STATES PATENTS

| 2,161,439 | 6/1939 | Thoma | 60—53 |
| 3,054,263 | 9/1962 | Budzich et al. | 60—53 |
| 3,126,707 | 3/1964 | Hann et al. | |
| 3,238,724 | 3/1966 | Miller. | |

EDGAR W. GEOGHEGAN, Primary Examiner

U.S. Cl. X.R.

60—53